(12) United States Patent
Kaippallimalil et al.

(10) Patent No.: US 11,438,317 B2
(45) Date of Patent: Sep. 6, 2022

(54) DEVICE IDENTIFICATION ENCRYPTION

(71) Applicant: HEWLETT PACKARD ENTERPRISE DEVELOPMENT LP, Houston, TX (US)

(72) Inventors: Mathew M. Kaippallimalil, Plano, TX (US); David C. Williamson, Plano, TX (US); Brad Thomas Kenyon, Omaha, NE (US); Lu Tian, Plano, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 362 days.

(21) Appl. No.: 15/420,865

(22) Filed: Jan. 31, 2017

(65) Prior Publication Data

US 2018/0219839 A1  Aug. 2, 2018

(51) Int. Cl.
*H04L 9/08* (2006.01)
*H04L 9/40* (2022.01)
*H04W 12/069* (2021.01)
*H04W 12/04* (2021.01)

(52) U.S. Cl.
CPC ........ *H04L 63/0478* (2013.01); *H04L 9/0838* (2013.01); *H04L 63/0428* (2013.01); *H04L 63/06* (2013.01); *H04L 63/0876* (2013.01); *H04L 63/0892* (2013.01); *H04W 12/04* (2013.01); *H04W 12/069* (2021.01); *H04L 2209/80* (2013.01)

(58) Field of Classification Search
CPC ............... H04L 63/0478; H04L 9/0838; H04L 63/0428; H04L 63/06; H04L 63/0876; H04L 63/0892; H04L 2209/80; H04W 12/04; H04W 12/069
See application file for complete search history.

(56) References Cited

U.S. PATENT DOCUMENTS

| | | | |
|---|---|---|---|
| 7,526,643 B2 | 4/2009 | Stedron et al. | |
| 7,617,524 B2 | 11/2009 | Haverinen et al. | |
| 8,755,795 B2 | 6/2014 | Aghili | |
| 9,667,600 B2* | 5/2017 | Piqueras Jover | H04L 9/321 |
| 2008/0086646 A1* | 4/2008 | Pizano | H04L 63/061 |
| | | | 713/182 |
| 2009/0279682 A1* | 11/2009 | Strandell | H04W 8/20 |
| | | | 379/201.02 |

(Continued)

FOREIGN PATENT DOCUMENTS

| | | |
|---|---|---|
| CN | 103152731 | 6/2013 |
| WO | WO-2001048981 | 7/2001 |
| WO | WO-2005006663 | 1/2005 |

OTHER PUBLICATIONS

Extended European Search Report, EP Application No. 18151565,1, dated Jun. 18, 2018, pp. 1-7, EPO.

(Continued)

*Primary Examiner* — Trang T Doan
(74) *Attorney, Agent, or Firm* — Hewlett Packard Enterprise Patent Department

(57) ABSTRACT

In one example in accordance with the present disclosure, a system may comprise a a combination engine to combine an encrypted device identification and a routing indicator resulting in a combined device identification. The system may also include an encryption engine to encrypt the combined device identification and a transmission engine to transmit the encrypted combined device identification.

20 Claims, 4 Drawing Sheets

(56) References Cited

U.S. PATENT DOCUMENTS

| | | | |
|---|---|---|---|
| 2012/0191978 A1* | 7/2012 | Little | H04L 63/0464 |
| | | | 713/176 |
| 2013/0227303 A1* | 8/2013 | Kadatch | H04L 9/0891 |
| | | | 713/193 |
| 2014/0254466 A1* | 9/2014 | Wurster | H04L 51/18 |
| | | | 370/312 |
| 2015/0046340 A1* | 2/2015 | Dimmick | G06Q 20/326 |
| | | | 705/72 |
| 2016/0149913 A1* | 5/2016 | Eriksson | H04L 67/2842 |
| | | | 726/6 |
| 2018/0077171 A1* | 3/2018 | Ramanujan | H04L 63/1408 |

OTHER PUBLICATIONS

ETSI, "Universal Mobile Telecommunications System (UMTS)"; 3G Security; Wireless Local Area Network (WLAN) Interworking Security, (Web Page), Dec. 2005, 88 pages.

Koien, G. M., "Privacy Enhanced Mutual Authentication in LTE", (Research Paper), 2013 IEEE 9th International Conference on Wireless and Mobile Computing, Networking and Communications (WiMob), Oct. 7-9, 2013, 8 pages.

* cited by examiner

DEVICE IDENTIFICATION ENCRYPTION

BACKGROUND

Wireless communication networks have increased in popularity with the advent of wireless devices, such as smartphones, mobile devices, etc. An authentication server, such as an authentication, authorization and accounting (AAA) server may handle requests for access to network resources.

BRIEF DESCRIPTION OF THE DRAWINGS

The following detailed description references the drawings, wherein.

DETAILED DESCRIPTION

An authentication server may, for example, authenticate a wireless device to verify and identify the wireless device for communication over a network. Wireless devices may have a variety of associated information used for uniquely identifying the wireless device, routing the wireless device, etc. For example, device identifiers, such as an International Mobile Subscriber Identity (IMSI), may be used to identify a wireless device to the authentication server and/or other network entities.

If an unauthorized entity, such as a malicious actor, gains access to device information, such as the device identifier, the unauthorized entity may be able to determine the physical location of a wireless device, access to accounts associated with the wireless device, etc.

Accordingly, it may be beneficial for the authentication server to conceal device information when transferring device information on a network. Concealing device information may be especially useful when the authentication server is communication with network entities on less secure networks, such as networks provided by certain Wi-Fi access points.

A routing indicator may also be included with the device information. A routing indicator may indicate a location on a network, such as a network entity, access point, etc. where the device information is to be sent. Although it may be beneficial to conceal the device information, as described above, it may be detrimental to fully conceal the routing indicator, as the routing indicator may be used by network entities other than the authentication server to route the device information.

Aspects of the systems and methods for device identification encryption discussed herein describe a mechanism where a network entity, such as the authentication server can insert a routing indicator with encrypted device information, while maintaining the data sizes suggested by standards.

The device information may be encrypted with a first encryption key known to the authentication server, but unknown to any other network entities. The combined device information and routing indicator may be encrypted using a public key known to other network entities. In this manner, the device information may be concealed, but the routing indicator may be accessed by other network entities.

A system for device identification encryption may include a combination engine to combine an encrypted device identification and a routing indicator resulting in a combined device identification. The system may also include an encryption engine to encrypt the combined device identification and a transmission engine to transmit the encrypted combined device identification.

Figure 1:
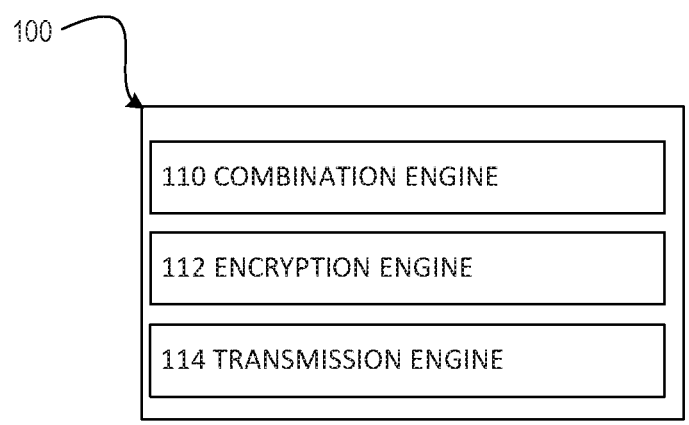
FIG. 1 is a block diagram of an example system for device identification encryption.

FIG. 1 is a block diagram of an example system 100 for device identification encryption. In one aspect, the system 100 may be part of and/or otherwise incorporated into an authentication server, such as an authentication, authorization and accounting (AAA) server. The system 100 may implement various engines to provide or support any of the device identification encryption features described herein. In the example shown in FIG. 1, the system 100 implements a combination engine 110, an encryption engine 112 and a transmission engine 114. Many of the features disclosed herein are described with respect to the combination engine 110, the encryption engine 112 and the transmission engine 114, though various other implementations are possible. Furthermore, in FIG. 1 and other figures described herein, different numbers of components or entities may be depicted.

The system 100 may implement the engines 110, 112 and 114 (including components thereof) in various ways, for example as hardware and programming. The programming for the engines 110, 112 and 114 may take the form of processor-executable instructions stored on a non-transitory machine-readable storage medium, and the processor-executable instructions may, upon execution, cause hardware to perform any of the features described herein. Implementations of engines 110-114 include, electronic circuitry (i.e., hardware) that implements the functionality of engines 110-114, such as an integrated circuit, programmable circuit, application integrated circuit (ASIC), controller, processor, semiconductor, processing resource, chipset, or other type of hardware component capable of the functionality of engines 110-114. Alternatively, engines 110-114 may include instructions (e.g., stored on a machine-readable medium) that, when executed by a hardware component (e.g., controller and/or processor), implements the functionality of engines 110-114. Although FIG. 1 illustrates engines 110, 112, and 114 as separate components, this was done for illustration purposes and not for purposes of limiting the disclosure. For example, engines 110, 112, and 114 may each include separate components, while in another implementation, engines 110, 112, 114 or combination thereof may be included as a single component.

Combination engine 110 may be configured to combine an encrypted device identification and a routing indicator resulting in a combined device identification. The encrypted device identification may be used to identify a device on a network. The encrypted device identification may be associated with device information, including a device identification. In some aspects, encryption engine 112 may be configured to encrypt device information, using a first encryption key, resulting in the encrypted device identification.

The device identification may be unique to a particular user on the network. One example format that may be used for the device identification is an International Mobile Subscriber Identity (IMSI). International mobile subscriber identity (IMSI) is a unique number associated with a subscriber of a cellular communications network. Example, cellular communication networks may include, for example, Global System for Mobile Communications (GSM) and Universal Mobile Telecommunications System (UMTS) network mobile phone users. In other words, the IMSI is a unique number identifying a subscriber. A portion of the IMSI may correspond to the cellular network carrier, while another portion may correspond to the subscriber.

The first encryption key may be unknown outside of the system. In other words, the first encryption key may be private to authentication server and not known to other network entities. Encryption engine 112 may be configured to incorporate a first type of encryption, such as Data Encryption Standard (DES). DES is a symmetric key algorithm used for encryption. Encryption engine 112 may be configured to perform the first type of encryption using the first encryption key. The encrypted device identification may conform to the standards used by the network. For example, in one aspect a network may use device identifications of a certain size, such as eight bytes. Accordingly, the device identification may have a size of eight bytes. After encryption, the encrypted device identity may also have a size of eight bytes.

Combination engine 110 may be configured to combine the encrypted user identification to the routing indicator in a variety of ways. For example, the routing indicator may be affixed to the end of the encrypted device identification. As another example, the encrypted device identification may be affixed to the beginning of the routing indicator. Although two examples have been provided, other forms of combining the encrypted device identity and routing indicator may be used. Similarly, combination engine 110 may be configured to combine the encrypted device identification with a random component. The random component, may be, for example, a randomly generated value affixed to the encrypted user identification and/or routing indicator.

The routing indicator may be a value used to identify a network, an access point and/or portion of a network to transmit device information to. For example, a routing indicator may identify a cell tower, a Wi-Fi access point, etc. As another example, the routing indicator may be used to determine a specific network, such as a home network, for a network device. In other words, an authentication server, a device, and/or component of an operator network may use the routing indicator to transmit data between network identities and the authentication server that created the temporary identity. Similar to the device identification, certain networks may have certain standards for the size of a routing indicator. In one aspect, the standard size for a routing indicator may be eight bytes. Accordingly, the combination engine 110 may be configured to use a routing indicator that conforms to the standard. In some aspects, the routing indicator may be smaller than the standard size used by the network. In these aspects, the routing indicator may be padded with additional data. Padding refers to the process of adding additional data to a number. The additional data may be, for example, randomly generated numbers.

In one aspect, the size of the routing indicator may be eight bytes and the size of the encrypted device identification may be eight bytes. Accordingly, the size of the combined device identification may be 16 bytes.

Encryption engine 112 may be configured to encrypt the combined device identification via a second encryption key. The second encryption key may be provided by a device, system, actor, etc. outside of system 100, such as an operator of a network. The second encryption key may be known to other entities connected to the network, so that these entities can decrypt the data and access the device identification.

Encryption engine 112 may be configured to incorporate a second type of encryption. The second type of encryption may be different than the first type of encryption. For example, the first type of encryption may be DES and the second type of encryption may be Advanced Encryption Standard (AES) encryption. Of course, these are only examples and other types of encryption may be used. The size of the combined device identification after the second encryption is performed may a standard used by the network. As discussed in the above example, a standard size used by a network may be 16 bytes. Accordingly, after the second encryption is performed, the size of the encrypted combined user identification may also be 16 bytes.

Combination engine 110 may also be configured to combine the encrypted combined device identification with a tag value and/or an index value. The encrypted combined device identification further combined with the tag value and/or index value may be referred to as a temporary identity. The tag value may also be used to indicate additional information. For example, in some aspects, there may be different types of temporary identities. Different types of temporary identities may include, for example, Pseudonyms, FastRe-Authentication IDs, etc. The tag value may be used to indicate what type of identity is being used. Other types of information that can be indicated by the tag value include whether an authentication and key agreement (AKA) is being used, whether there is a SIM identity, etc.

The index value may be used to identify a reference to a key used in the encryption. The index value may be a reference to a key and not the key itself. The index value may identify a reference to, for example, the first encryption key, the second encryption key, etc. The index value may be, for example, a number that indicates a key to use from a key store. The contents of the key store may remain private. By using the index value, the identity of the key may be kept private, while still communication which key was used.

When the temporary identity is being used, the authentication server may decrypt the supplied value. To do so, the AAA may use the index value to determine which key to use to decrypt the encrypted identity. The tag value and index value may also conform to a standard size used by the network. For example, the combined size of the tag and index value may be 10 bits. If the combined size of the tag and index value is less than 10 bits, additional padding bits may be used. For example padding bits may take the form of random numbers appended to the end of the tag and index value, the beginning of the tag and index value, etc.

As discussed above, the size of the encrypted combined device identification may also be 16 bytes. Sixteen bytes may be equivalent to 128 bits. After adding the tag and index value, the total size of the temporary identify may be 138 bits. In some aspects, a network standard may use device identifiers of a certain character length. Accordingly, in some aspects the combination engine may encode the temporary identification. For example, the combination engine may base 64 encode the 138 bit temporary identity value to create a 23 character value. In this manner, the device identification is concealed while still conforming to the standard device identifier size of the network.

Transmission engine may be configured to transmit the encrypted combined device identification. Transmission Engine 114 may be configured to transmit the temporary identification and/or encrypted combined device identification to an address specified in the routing indicator. The address may correspond to, for example, a network location, an access point, etc.

Figure 2:
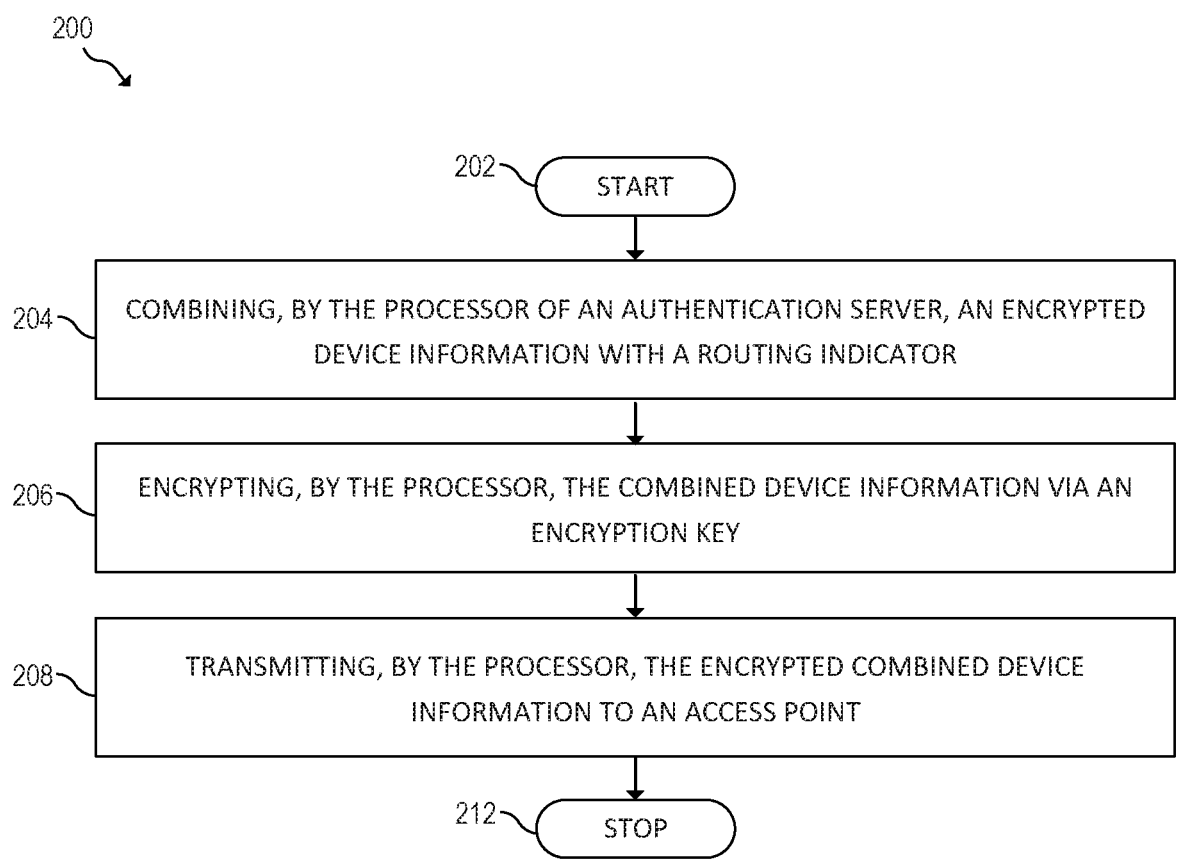
FIG. 2 is a block diagram of an example method for device identification encryption.
Figure 3:
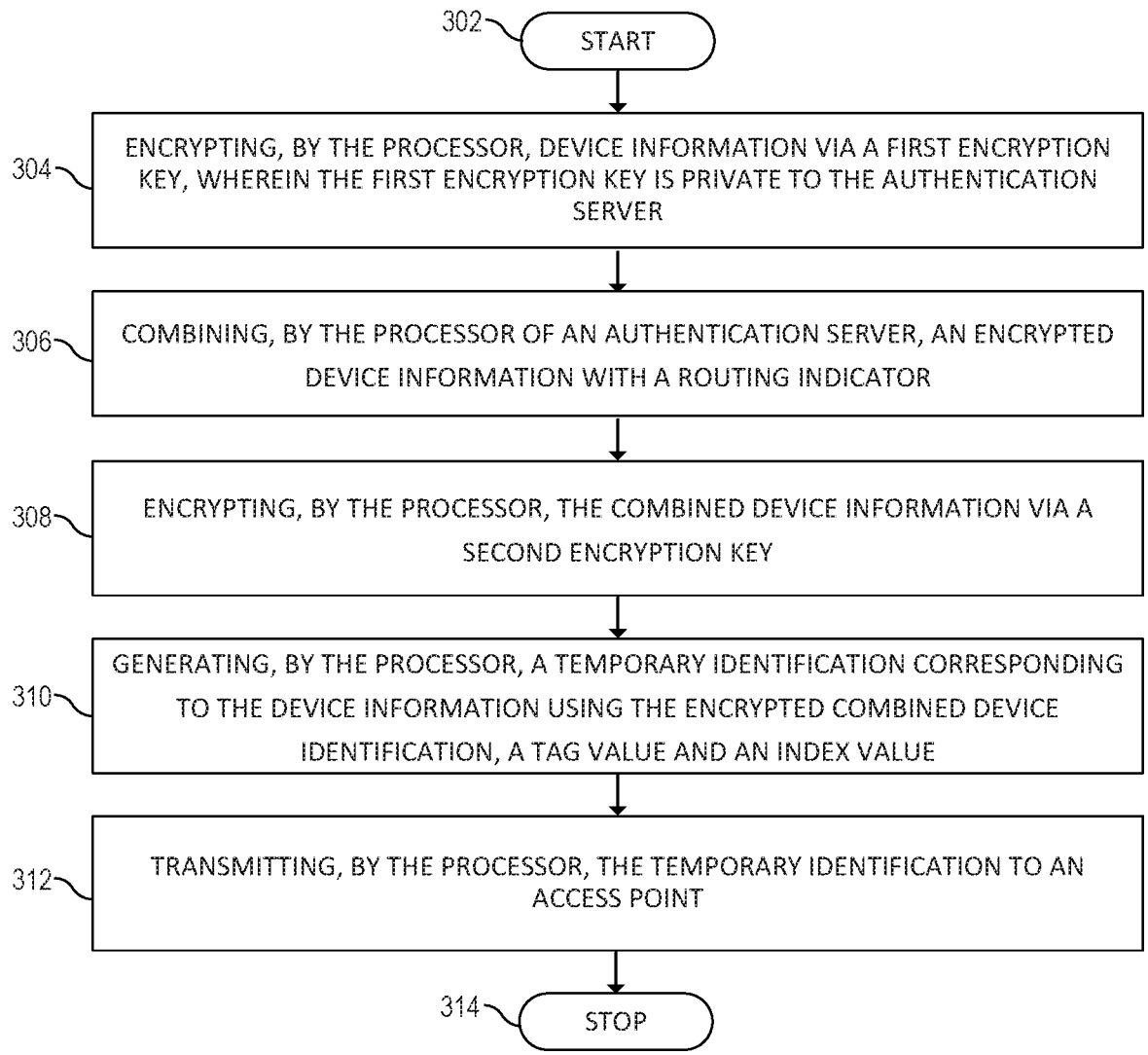
FIG. 3 is a block diagram of another example method for device identification encryption.

Referring now to FIGS. 2 and 3, flow diagrams are illustrated in accordance with various examples of the present disclosure. The flow diagrams represent processes that may be utilized in conjunction with various systems and devices as discussed with reference to the preceding figures, such as, for example, system 100 described in reference to FIG. 1 and/or system 400 described in reference to FIG. 4. While illustrated in a particular order, the flow diagrams are not intended to be so limited. Rather, it is expressly contemplated that various processes may occur in different orders and/or simultaneously with other processes than those illustrated. As such, the sequence of operations described in connection with FIGS. 2-3 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples.

FIG. 2 is a flowchart of an example method 200 for device identification encryption. Method 200 may start at block 202 and continue to block 204, where the method 200 may include combining, by the processor of an authentication server, an encrypted device information with a routing indicator. The encrypted user identity may be eight bytes and the routing indicator may be eight bytes. The encrypted user identity may correspond to device information, such as a device identifier that has been encrypted via a first encryption key that is private to an authentication server.

At block 206, the method may include encrypting, by the processor, the combined device information via an encryption key, such as a second encryption key. The first encryption key may be of a first type of encryption and the second encryption key may be of a second type of encryption. For example, the first encryption key may utilize Data Encryption Standard (DES). The second encryption key may utilize Advanced Encryption Standard (AES). The first encryption key may be concealed from devices on the network other than the authentication server. The second encryption key may be provided by an operator associated with a network, such as, for example, a cellular network. The second encryption key may be known to network entities other than the user device. The encrypted device identification may also be combined with a random component. The random component, may be, for example, a randomly generated value affixed to the encrypted user identification and/or routing indicator.

At block 208, the method may include transmitting, by the processor, the encrypted combined device information to an access point. The encrypted combined device information may be transmitted the temporary identification and/or encrypted combined device identification to an address specified in the routing indicator. The address may correspond to, for example, a network location, an access point, etc. The method may proceed to block 210, where the method may end.

FIG. 3 is a flowchart of an example method 300 for device identification encryption. Method 300 may start at block 302 and continue to block 304, where the method 300 may include encrypting, by the processor, device information via a first encryption key. The first encryption key is private to the authentication server. The encrypted user identity may be eight bytes. The combined user identification may be 16 bytes. At block 306, the method may include combining, by the processor of an authentication server, an encrypted device information with a routing indicator. The routing indicator may be eight bytes.

At block 308, the method may include encrypting, by the processor, the combined device information via an encryption key, such as a second encryption key. The first encryption key may be of a first type of encryption and the second encryption key may be of a second type of encryption. For example, the first encryption key may utilize Data Encryption Standard (DES). The second encryption key may utilize Advanced Encryption Standard (AES). The first encryption key may be concealed from devices on the network other than the authentication server. The second encryption key may be provided by an operator associated with a network, such as, for example, a cellular network. The second encryption key may be known to network entities other than the user device. The encrypted device identification may also be combined with a random component. The random component, may be, for example, a randomly generated value affixed to the encrypted user identification and/or routing indicator. At block 310, the method may include generating, by the processor, a temporary identification corresponding to the device information using the encrypted combined device identification, tag value, and/or index value.

The tag value may also be used to indicate additional information. For example, in some aspects, there may be different types of temporary identities. Different types of temporary identities may include, for example, pseudonyms, FastReAuthentication IDs, etc. The tag value may be used to indicate what type of identity is being used. Other types of information that can be indicated by the tag value include whether an authentication and key agreement (AKA) is being used, whether there is a SIM identity, etc.

The index value may be used to identify a reference to a key used in the encryption. The index value may be a reference to a key and not the key itself. The index value may identify a reference to, for example, the first encryption key, the second encryption key, etc. The index value may be, for example, a number that indicates a key to use from a key store. The contents of the key store may remain private. By using the index value, the identity of the key may be kept private, while still communication which key was used.

At block 312, the method may include transmitting, by the processor, the encrypted combined device information to an access point. The encrypted combined device information may be transmitted the temporary identification and/or encrypted combined device identification to an address specified in the routing indicator. The address may correspond to, for example, a network location, an access point, etc. The method may proceed to block 314, where the method may end.

Figure 4:
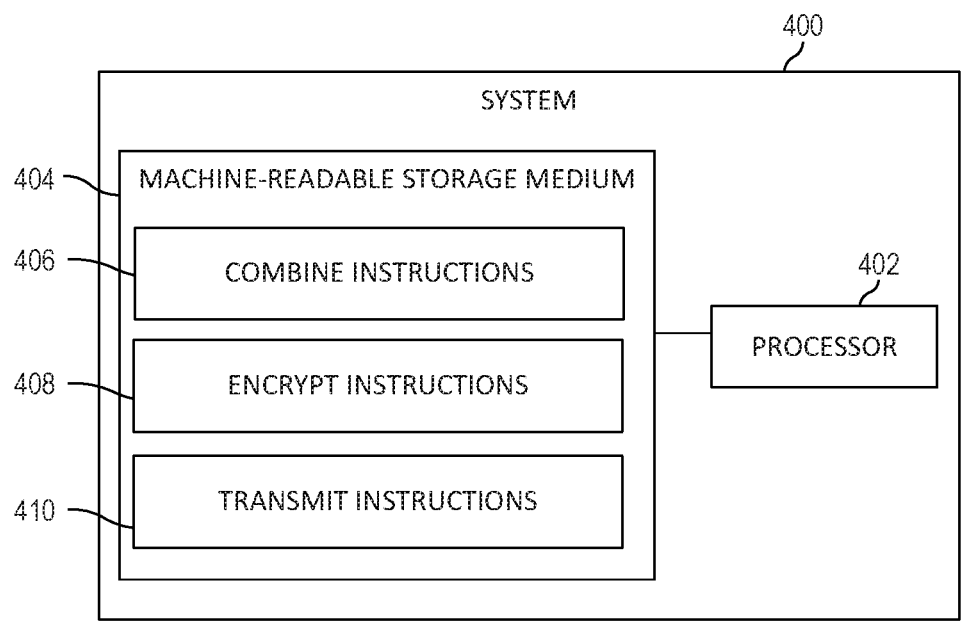
FIG. 4 is a block diagram of an example system for device identification encryption.

FIG. 4 is a block diagram of an example system 400 for device identification encryption. System 400 may be similar to system 100 of FIG. 1, for example. In the example illustrated in FIG. 4, system 400 includes a processor 402 and a machine-readable storage medium 404. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 402 may be at least one central processing unit (CPU), microprocessor, and/or other hardware devices suitable for retrieval and execution of instructions stored in machine-readable storage medium 404. In the example illustrated in FIG. 4, processor 502 may fetch, decode, and execute instructions 406, 408, 410 to perform user identity encryption. Processor 402 may include at least one electronic circuit comprising a number of electronic components for performing the functionality of at least one of the instructions in machine-readable storage medium 404. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 404 may be any electronic, magnetic, optical, or other physical storage device that stores executable instructions. Thus, machine-readable storage medium 404 may be, for example, Random Access Memory (RAM), an Electrically-Erasable Programmable Read-Only Memory (EEPROM), a storage drive, an optical disc, and the like. Machine-readable storage medium 404 may be disposed within system 400, as shown in FIG. 4. In this situation, the executable instructions may be "installed" on the system 400. Machine-readable storage medium 404 may be a portable, external or remote storage medium, for example, that allows system 400 to download the instructions from the portable/external/remote storage medium. In this situation, the executable instructions may be part of an "installation package". As described herein, machine-readable storage medium 404 may be encoded with executable instructions for context aware data backup. The machine-readable storage medium may be non-transitory.

Combine instructions 408, when executed by a processor (e.g., 402), may cause system 400 to combine an encrypted device identification with a routing indicator resulting in a combined device identification. The routing indicator may be eight bytes. The combined user identification may be 16 bytes. The encrypted user identification may also be combined with a random component. The random component, may be, for example, a randomly generated value affixed to the encrypted user identification and/or routing indicator.

In some aspects, the encrypted device identification may be associated with a device identification. Accordingly, the encrypted device identification may be created by encrypting a device via a first encryption key. The first encryption key is private to an authentication server.

Encrypt instructions 406, when executed by a processor (e.g., 402), may also cause system 400 to encrypt the combined device identification via a second encryption key. The first encryption key may be of a first type of encryption and the second encryption key may be of a second type of encryption. For example, the first encryption key may utilize Data Encryption Standard (DES). The second encryption key may utilize Advanced Encryption Standard (AES). The first encryption key may be concealed from other devices on a network. The second encryption key may be provided by an operator associated with a network, such as, for example, a cellular network. The second encryption key may be known to network entities other than the user device.

Transmit instructions 408, when executed by a processor (e.g., 402), may cause system 400 to transmit the encrypted combined device identification. The encrypted combined device identification may be transmitted to an address specified in the routing indicator. The address may correspond to, for example, a network location, an access point, etc.

The foregoing disclosure describes a number of examples for device identification encryption. The disclosed examples may include systems, devices, computer-readable storage media, and methods for device identification encryption. For purposes of explanation, certain examples are described with reference to the components illustrated in FIGS. 1-4. The functionality of the illustrated components may overlap, however, and may be present in a fewer or greater number of elements and components. Further, all or part of the functionality of illustrated elements may co-exist or be distributed among several geographically dispersed locations. Further, the disclosed examples may be implemented in various environments and are not limited to the illustrated examples.

Further, the sequence of operations described in connection with FIGS. 1-4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A system comprising:
   a processor; and
   memory coupled to the processor and storing instructions therein, when executed by the processor causes the system to execute:
   a combination engine to:
      combine an encrypted device identification associated with identifying a device accessing a network and a routing indicator, the combination resulting in a combined device identification, wherein the encrypted device identification is encrypted using a first encryption key that is concealed from one or more additional devices connected to the network other than an authentication server and further wherein, prior to being encrypted, a device identification has a standard size that is associated with the network and the encrypted device identification has a size that conforms to the standard size of the device identifier for the network;
      combine an encrypted combined device identification with a tag and an index value to create a temporary identification; and
      encode the temporary identification, wherein the temporary identification is base 64 encoded to create a size of the temporary identification that conforms to the standard size of the device identifier for the network while the device identifier is concealed;
   an encryption engine to encrypt the combined device identification, wherein the combined device identification is encrypted using a second encryption key that is known to the one or more additional devices connected to the network; and
   a transmission engine to transmit the encrypted combined device identification or the temporary identification when communicating information from the device via the network.

2. The system of claim 1, wherein the first encryption key is a private key that is known to the authentication server.

3. The system of claim 2, wherein the first encryption key is used to perform a first type of encryption and the second encryption key is used to perform a second type of encryption other than the first type.

4. The system of claim 2, wherein the second encryption key is provided by a network operator.

5. The system of claim 1, wherein the transmission engine transmits the encrypted combined device identification to an access point indicated by the routing indicator.

6. The system of claim 1, wherein the encryption engine encrypts the device identification identifying the device accessing the network, the encryption resulting in the encrypted device identification.

7. The system of claim 1, wherein the combination engine combines the encrypted device identification with the routing indicator via affixation of the routing indicator to an end of the encrypted device identification.

8. The system of claim 1, wherein the size of the encrypted device identification is at least eight bytes, the routing indicator is at least eight bytes and the combined device identification is at least 16 bytes.

9. The system of claim 1, wherein the standard size of the device identification is at least eight bytes.

10. The system of claim 1, wherein the standard size of the device identification is a specified character length, and the size of the temporary identification is equal to the specified character length.

11. The system of claim 1, wherein the standard size of the device identification that is associated with the network is based on an International Mobile Subscriber Identity (IMSI) format.

12. The system of claim 1, wherein a combined size of the tag and the index value is at least 10 bits.

13. A method comprising:
    combining, by a processor of an authentication server, an encrypted device identification associated with identifying a device accessing a network with a routing indicator, the combination resulting in a combined device identification, wherein the encrypted device identification is encrypted using a first encryption key that is concealed from one or more additional devices connected to the network other than the authentication server and further wherein, prior to being encrypted, a device identification has a standard size that is associated with the network and the encrypted device identification has a size that conforms to the standard size of the device identifier for the network;
    encrypting, by the processor, the combined device identification using a second encryption key, wherein the second encryption key is known to the one or more additional devices connected to the network;
    combining, by the processor, an encrypted combined device identification with a tag and an index value to create a temporary identification;
    encoding, by the processor, the temporary identification, wherein the temporary identification is base 64 encoded to create a size of the temporary identification that conforms to the standard size of the device identifier for the network while the device identifier is concealed; and
    transmitting, by the processor, the encrypted combined device identification or the temporary identification to an access point when communicating information from the device via the network.

14. The method of claim 13, wherein the first encryption key is a private key that is known to the authentication server.

15. The method of claim 13, wherein the device associated with the encrypted device information is connected to a first network and the routing indicator identifies an access point associated with a second network.

16. The method of claim 15, wherein the first encryption key is concealed from network entities connected to the first network and the second network other than the authentication server.

17. A non-transitory machine-readable storage medium storing instructions thereon, the instructions executable by a processor of a system to cause the system to:
    combine an encrypted device identification associated with identifying a user device accessing a network with a routing indicator, the combination resulting in a combined device identification, wherein the encrypted device identification is encrypted using a first encryption key that is concealed from one or more additional devices connected to the network and further wherein, prior to being encrypted, a device identification has a standard size that is associated with the network and the encrypted device identification has a size that conforms to the standard size of the device identifier for the network;
    encrypt the combined device identification via a second encryption key, wherein the second encryption key is known to the one or more additional devices connected to the network;
    combine an encrypted combined device identification with a tag and an index value to create a temporary identification;
    encode the temporary identification, wherein the temporary identification is base 64 encoded to create a size of the temporary identification that conforms to the standard size of the device identifier for the network while the device identifier is concealed; and
    transmit the encrypted combined device identification or the temporary identification based on the routing indicator when communicating information from the user device via the network.

18. The non-transitory machine-readable storage medium of claim 17, wherein the instructions executable by the processor of the system to cause the system to:
    encrypt the device identification associated with the user device using the first encryption key used to perform a first type of encryption, resulting in the encrypted device identification.

19. The non-transitory machine-readable storage medium of claim 18 wherein the second encryption key is provided by an operator of the network and the first encryption key is concealed from the one or more additional devices and other network entities on the network other than an authentication server.

20. The non-transitory machine-readable storage medium of claim 17, wherein the instructions executable by the processor of the system to:
    combine the encrypted device identification with the routing indicator by affixing the routing indicator to a beginning of the encrypted device identification.

* * * * *